(12) United States Patent
Matsui et al.

(10) Patent No.: US 7,614,245 B2
(45) Date of Patent: Nov. 10, 2009

(54) FUEL CELL POWER GENERATION REFRIGERATING SYSTEM

(75) Inventors: Nobuki Matsui, Osaka (JP); Masanobu Kawazoe, Osaka (JP); Kazuo Yonemoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 8 days.

(21) Appl. No.: 10/594,601

(22) PCT Filed: Mar. 10, 2005

(86) PCT No.: PCT/JP2005/004182

§ 371 (c)(1),
(2), (4) Date: Mar. 28, 2007

(87) PCT Pub. No.: WO2005/099006

PCT Pub. Date: Oct. 20, 2005

(65) Prior Publication Data

US 2007/0193289 A1    Aug. 23, 2007

(30) Foreign Application Priority Data

Mar. 31, 2004 (JP) .............................. 2004-106584

(51) Int. Cl.
*F25B 27/00* (2006.01)
(52) U.S. Cl. .......................................... 62/230; 62/236
(58) Field of Classification Search ............... 62/236, 62/228.1, 230, 239–244
See application file for complete search history.

(56) References Cited

U.S. PATENT DOCUMENTS

| 4,377,074 A | 3/1983 | Jardine | |
| 5,678,410 A * | 10/1997 | Fujita et al. | 62/7 |
| 6,453,693 B1 * | 9/2002 | Ewert et al. | 62/236 |
| 6,755,041 B2 * | 6/2004 | Wessells et al. | 62/236 |
| 7,213,664 B2 * | 5/2007 | Nomura et al. | 180/65.1 |
| 2004/0066094 A1 | 4/2004 | Suzuki et al. | |
| 2005/0074665 A1 * | 4/2005 | Spaziante et al. | 429/50 |

FOREIGN PATENT DOCUMENTS

| DE | 102 33 821 A1 | 2/2004 |
| EP | 1 279 907 A2 | 1/2003 |
| EP | 1 387 462 A2 | 2/2004 |
| JP | 2-40461 Y2 | 10/1990 |
| JP | 8-5190 A | 1/1996 |
| JP | 2001-201138 A | 7/2001 |
| JP | 2001-231176 A | 8/2001 |
| JP | 2002-198079 A | 7/2002 |
| JP | 2003-77507 A | 3/2003 |
| JP | 2003-130491 A | 5/2003 |
| JP | 2003-130491 A1 | 5/2003 |
| JP | 2003-164063 A | 6/2003 |
| JP | 2003-262409 A | 9/2003 |
| JP | 2004-80987 A | 3/2004 |

* cited by examiner

*Primary Examiner*—William E Tapolcai
(74) *Attorney, Agent, or Firm*—Birch, Stewart, Kolasch & Birch, LLP

(57) ABSTRACT

A cell body receiving fuel supply to generate power, an inverter receiving output power of the cell body to convert it into ac power, and a vapor-compression refrigerating machine receiving the ac power output from the inverter as operating power and using a motor as its driving source are provided. An intermediate part of a connection line connecting the aforementioned inverter and vapor-compression refrigerating machine is connected to a refrigeration air-conditioning power board to make effective use of a fuel cell and to prevent the footprint and construction costs from increasing.

19 Claims, 18 Drawing Sheets

FUEL CELL POWER GENERATION REFRIGERATING SYSTEM

BACKGROUND OF THE INVENTION

1. Field of the Invention

This invention relates to a fuel cell power generation refrigerating system intended to use output power from a fuel cell as operating power of a vapor-compression refrigerating machine and to use power from a commercial system according to necessity.

2. Description of the Background Art

Driving an inverter-drive air-conditioning outdoor unit by output power of a fuel cell (cf. Japanese Patent Application Laid-Open No. 8-5190 (1996)) and providing a battery or a fuel cell for supplementally supplying power to an inverter-drive air-conditioning outdoor unit driven by power from a commercial system (cf. Japanese Patent Application Laid-Open No. 2001-201138) have conventionally been proposed.

The description of JP8-5190 is only directed to driving an inverter-drive air-conditioning outdoor unit by generated power of a fuel cell, and therefore, it is not possible to make effective use of the fuel cell when an air conditioner is stopping.

JP2001-201138 has an object to save power at the time of air-conditioning peak load and thus only describes a supplemental use of a fuel cell in case of request for power savings. Further, it does not at all mention the effective use throughout the year such as the time when air conditioning is stopping and an intermediate period, etc. Therefore, it is not possible to make effective use of the fuel cell.

A decentralized generator has conventionally been proposed, which has a generating set provided separately from an air conditioner. Therefore, a power system needs to be provided with a power board for connection with a generator and a power board for air conditioning separately, which increases the footprint and construction costs.

SUMMARY OF THE INVENTION

This invention has been made in view of the above-described problems, and has an object to provide a fuel cell power generation refrigerating system capable of making effective use of a fuel cell as well as preventing or suppressing increase in footprint and construction costs.

A fuel cell power generation refrigerating system of the present invention provides driving power of a compression-machine-driving motor of a vapor-compression refrigerating machine by power generated by a fuel cell, and supplies power generated by the fuel cell to a commercial system side in response to that total required power of the vapor-compression refrigerating machine is below a power generation capacity of the fuel cell and that the vapor-compression refrigerating machine is stopping.

A refrigerating machine mentioned here is a refrigerating machine in a broad sense, including all electric-driven ones that adopt a compression cycle, such as a heat pump air conditioner.

According to this invention, it is possible to make effective use of generated power of the fuel cell throughout the year and to allow combined use of a power board for a generating set and a power board for air conditioning, so that an economically-improved energy-efficient fuel cell power generation refrigerating system can be constructed with reduced footprint and equipment/construction costs.

Further, in a building already equipped with an electric air conditioner, introducing the present system when renewing the electric air conditioner allows an already-provided power board for air conditioning to be used as-is as the power board for the generating set, which can significantly reduce introductory initial costs.

A fuel cell power generation refrigerating system of another invention comprises: a vapor-compression refrigerating machine; a power board supplying operating power to the vapor-compression refrigerating machine using a power supply of a commercial system as an input; a fuel cell; a first power conversion element performing predetermined power conversion using an output of the fuel cell as an input to supply operating power to a compression-machine-driving motor of the vapor-compression refrigerating machine; and a power supply control element providing driving power of a compression-machine-driving motor of the vapor-compression refrigerating machine by power generated by the fuel cell and supplying power generated by the fuel cell to the commercial system side in response to that total required power of the vapor-compression refrigerating machine is below a power generation capacity of the fuel cell and that the vapor-compression refrigerating machine is stopping.

A refrigerating machine mentioned here is a refrigerating machine in a broad sense, including all electric-driven ones that adopt a compression cycle, such as a heat pump air conditioner.

According to this invention, it is possible to make effective use of generated power of the fuel cell throughout the year and to allow combined use of the power board for the generating set and power board for air conditioning, so that an economically-improved energy-efficient fuel cell power generation refrigerating system can be constructed with reduced footprint and equipment/construction costs.

Further, in a building already equipped with an electric air conditioner, introducing the present system when renewing the electric air conditioner allows an already-provided power board for air conditioning to be used as-is as the power board for the generating set, which can significantly reduce introductory initial costs.

In these cases, in a refrigerating machine which drives a compression machine via an inverter, it is preferable that a second power conversion element be further provided between the commercial system and the compression-machine-driving motor, and that the first power conversion element between the fuel cell and the compression-machine-driving motor and the second power conversion element share the same inverter, which achieves reduced footprint and equipment/construction costs as well as reduced conversion losses of the inverter, so that economy and energy efficiency can further be improved.

Further, it is preferable that a plurality of compression machines for vapor-compression refrigerating machine and a plurality of inverters be further provided, that the number of compression machines be controlled according to required operating load of the vapor-compression refrigerating machine, and that generated power of the fuel cell be supplied to the commercial system side from an inverter in a not-operating compression machine system, which allows generated power of the fuel cell to be also supplied to the commercial system side at the time of partial load operation.

Further, it is preferable that a bidirectional AC/DC inverter be adopted as an AC/DC converter to be connected with the aforementioned commercial system, which allows power supply to the refrigerating machine side and power supply to the commercial system side to be separated, so that surplus generated power of the fuel cell can be supplied to the commercial system side without being affected by operating frequencies of the refrigerating machine.

Further, it is preferable that a plurality of compression machines for the vapor-compression refrigerating machine be further provided, and that some of the motors for driving some of the compression machines be connected directly to the commercial system side, which can achieve reduced capacity of the inverter as well as reduced costs and apparatus volume.

Further, it is preferable that a capacity of a fuel cell be set higher than a capacity of an inverter supplying operating power to the compression-machine-driving motor of a vapor-compression refrigerating machine, and that generated power be supplied to the commercial system side via the bidirectional AC/DC inverter in response to that the fuel cell is operating at the maximum capacity, so that power can also be supplied to the commercial system side at the time when the vapor-compression refrigerating machine is operating at the maximum capacity.

Further, it is preferable that the amount of power supply from the commercial system side to a system inside a building including a fuel cell power generation refrigerating system be detected, and that power output control of the fuel cell power generation refrigerating system be performed in response to the detected amount of power supply, allowing appropriate capacity control of the fuel cell, which can prevent reverse power flow to system power and the like.

Further, it is preferable that a battery element connected in parallel to the fuel cell be further included. In the case where a general load makes fast load fluctuations so that the operating capacity of the fuel cell does not follow, the battery element is charged and discharged, which allows the imbalance between consumption power of the load and amount of power generation of the fuel cell to be counteracted.

Further, it is preferable that the amount of power supply from the commercial system side to a system inside a building including the fuel cell power generation refrigerating system be detected, that it be detected that the detected amount of power supply has been reduced to a degree that may cause reverse power flow, and that in response to this detection, an operating capacity of the vapor-compression refrigerating machine be increased forcedly until the fuel cell follows a load, so that the delay in following the load can be prevented without providing the battery element, and in the case where the battery element is provided, the capacity of the battery element can be reduced.

Further, it is preferable that a plurality of fuel cell power generation refrigerating systems be provided for one power customer, which allows close follow-up to a refrigeration load as well as improved follow-up of power to the load by controlling the number of units even in the case where the general load is small, and further, the reliability of power supply can be increased.

Further, it is preferable that a controller be provided in common for the plurality of fuel cell power generation refrigerating systems, and that the controller provided in common at least control operation of fuel cells of the plurality of fuel cell power generation refrigerating systems, which allows a scheduled operation, total generation capacity control and the like to be carried out efficiently.

Further, it is preferable that the amount of power supply from the commercial system side to a system inside a building including the fuel cell power generation refrigerating system be detected, and that the controller provided in common control operation of the fuel cells in response to the detected amount of power supply. Concentration of information to the controller allows appropriate concentrated operation control.

Further, it is preferable that a fee output element at least outputting an electricity fee and a fuel fee and a control element controlling operation of the fuel cell and performing distribution control of output power in response to the fees be further provided, which can perform fine priority-giving output control (control as to which output is given priority) according to season, time, and the like, so that running merits can be maximized.

Further, it is preferable that the aforementioned fee output element allow unit cost data and fee calculation software for fee calculation to be rewritten at a remote place, which can save customers from having to input these data and software and prevent disadvantages caused by failure to update and the like.

Further, it is preferable that the aforementioned vapor-compression refrigerating machine utilize a direct expansion cycle. Arranging refrigerating machines of direct expansion cycle in a distributed manner for respective load systems, which can facilitate follow-up to load and individual operation/stop, which in turn can achieve improved convenience and energy efficiency.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of a fuel cell power generation refrigerating system of the present invention will be described in detail with reference to accompanied drawings.

Figure 1:
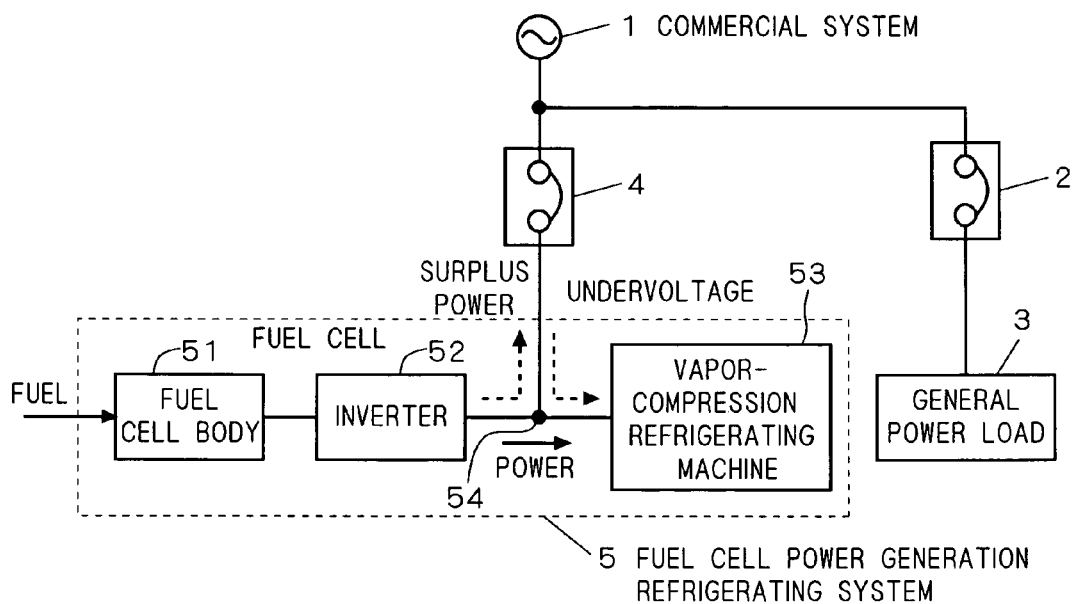
[FIG. 1] is a block diagram showing a power system including one embodiment of a fuel cell power generation refrigerating system of the present invention.

FIG. 1 is a block diagram showing a power system including one embodiment of a fuel cell power generation refrigerating system of the present invention.

This power system connects a general power load 3 to a commercial system 1 via a general power board 2, and a fuel cell power generation refrigerating system 5 via a refrigeration air-conditioning power board 4.

Since the aforementioned general power board 2 and refrigeration air-conditioning power board 4 are conventionally known, explanation is omitted.

The aforementioned general power load 3 is a load other than a refrigerating machine and air conditioner among power loads installed in a building, store, or the like, which can be exemplified by an elevator, electric light, personal computer and the like.

The aforementioned fuel cell power generation refrigerating system 5 includes a cell body 51 receiving conventionally-known fuel supply to generate power, an inverter 52 receiving output power of the cell body 51 to convert it into ac power and a vapor-compression refrigerating machine 53 receiving ac power output from the inverter 52 as operating power. This vapor-compression refrigerating machine 53 has a motor driven by output power of the inverter 52 or commercial system power, as its driving source, and this vapor-compression refrigerating machine 53 serves as a refrigerant driving source for an air conditioner, for example. Besides, an intermediate part 54 of a connection line connecting the aforementioned inverter 52 and vapor-compression refrigerating machine 53 is connected to the refrigeration air-conditioning power board 4.

Figure 2:
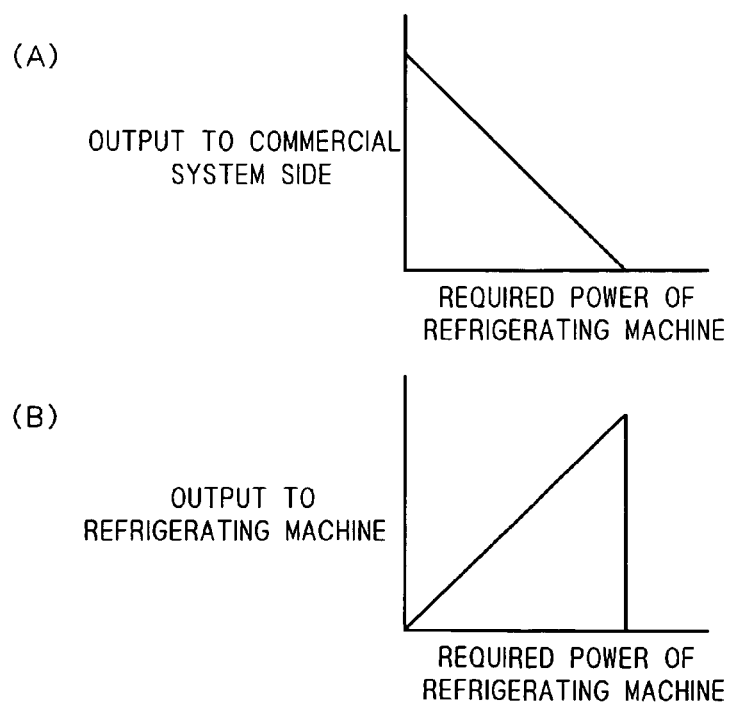
[FIG. 2] are diagrams explaining power output to a commercial system side and power output to a vapor-compression refrigerating machine.

FIG. 2 show diagrams explaining power output to the commercial system side (cf. (A) in FIG. 2) and power output to the vapor-compression refrigerating machine 53 (cf. (B) in FIG. 2).

As understood from FIG. 2, as required power of the vapor-compression refrigerating machine 53 decreases, power output to the vapor-compression refrigerating machine 53 decreases while power output to the commercial system 1 side increases.

Accordingly, it is possible to make effective use of generated power of the fuel cell throughout the year and to allow combined use of the power board for the generating set and power board for air conditioning, so that an economically-improved energy-efficient fuel cell power generation refrigerating system can be constructed with reduced footprint and equipment/construction costs.

Figure 3:
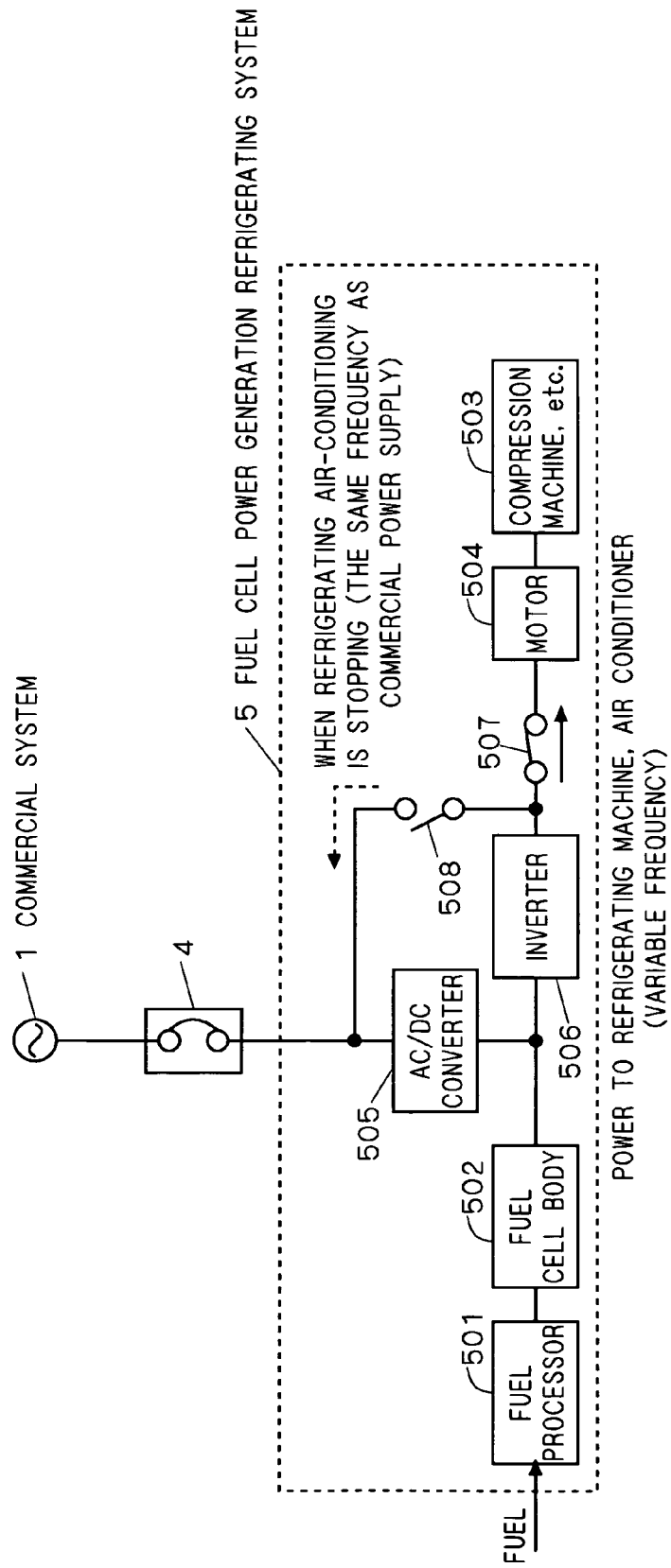
[FIG. 3] is a block diagram showing another configuration of the fuel cell power generation refrigerating system.

FIG. 3 is a block diagram showing another configuration of the fuel cell power generation refrigerating system 5.

This fuel cell power generation refrigerating system 5 has a fuel processor 501 processing fuel supplied from the outside, a fuel cell body 502 receiving processed fuel, a compression machine 503, etc., a motor 504 serving as a driving source of the compression machine, etc., an AC/DC converter 505 connected to the commercial system 1 via the refrigeration air-conditioning power board 4, an inverter 506 receiving output of the fuel cell body 502 and output of the AC/DC converter 505, a first switch 507 supplying output of the inverter 506 to the motor 504, and a second switch 508 supplying output of the inverter 506 to the refrigeration air-conditioning power board 4.

In this case, the same inverter is used in common for power conversion between the commercial system and the compression-machine-driving motor and power conversion between the fuel cell and the compression-machine-driving motor, which thus achieves reduced footprint and equipment/construction costs as well as reduced conversion losses of the inverter, so that economy and energy efficiency can further be improved.

Figure 4:
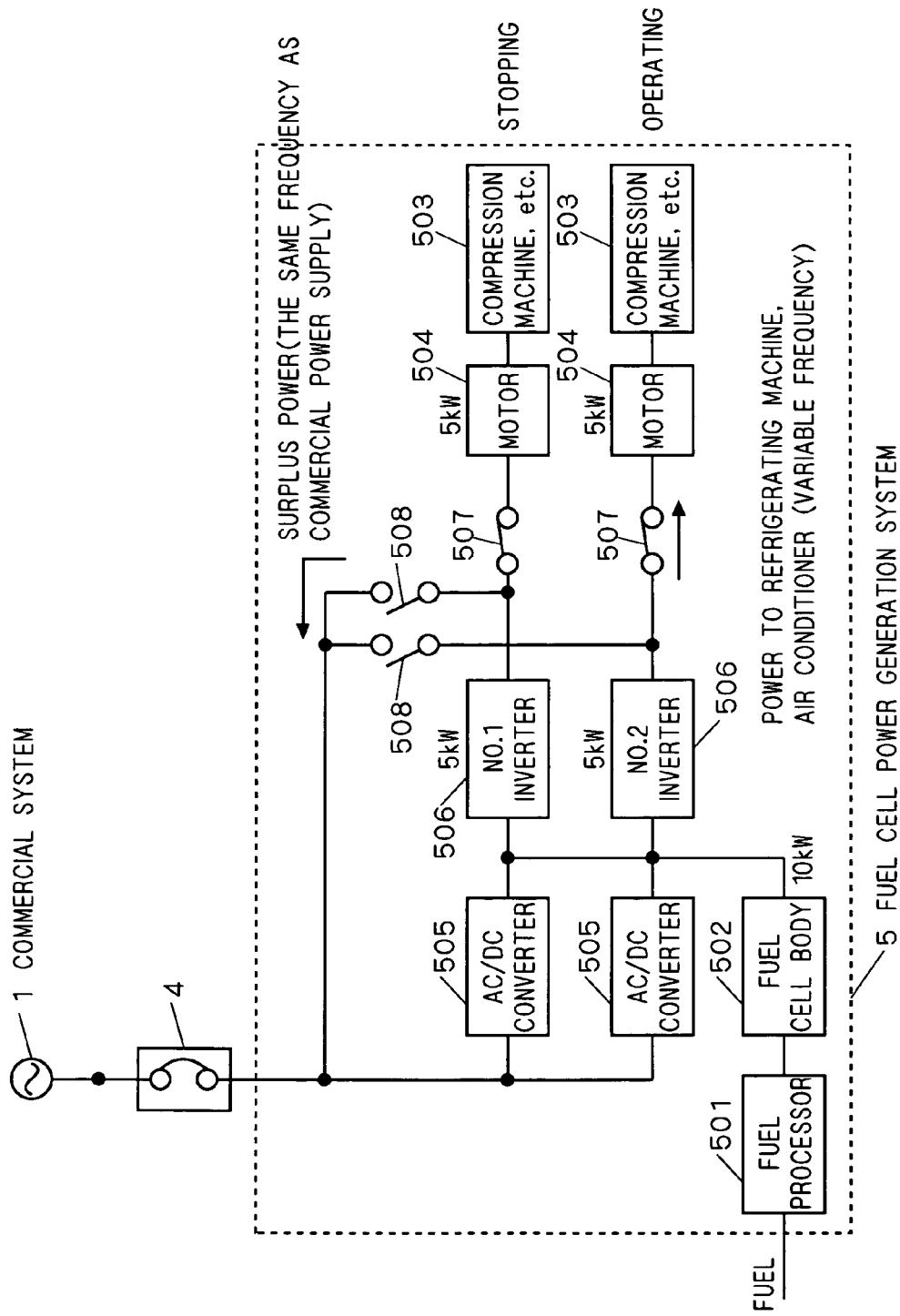
[FIG. 4] is a block diagram showing still another configuration of the fuel cell power generation refrigerating system.

FIG. 4 is a block diagram showing still another configuration of the fuel cell power generation refrigerating system 5.

This fuel cell power generation refrigerating system 5 only differs from the fuel cell power generation refrigerating system 5 shown in FIG. 3 in that the compression machine 503, etc., motor 504, AC/DC converter 505, inverter 506, first switch 507, and second switch 508 are provided in two systems in parallel.

Figure 5:
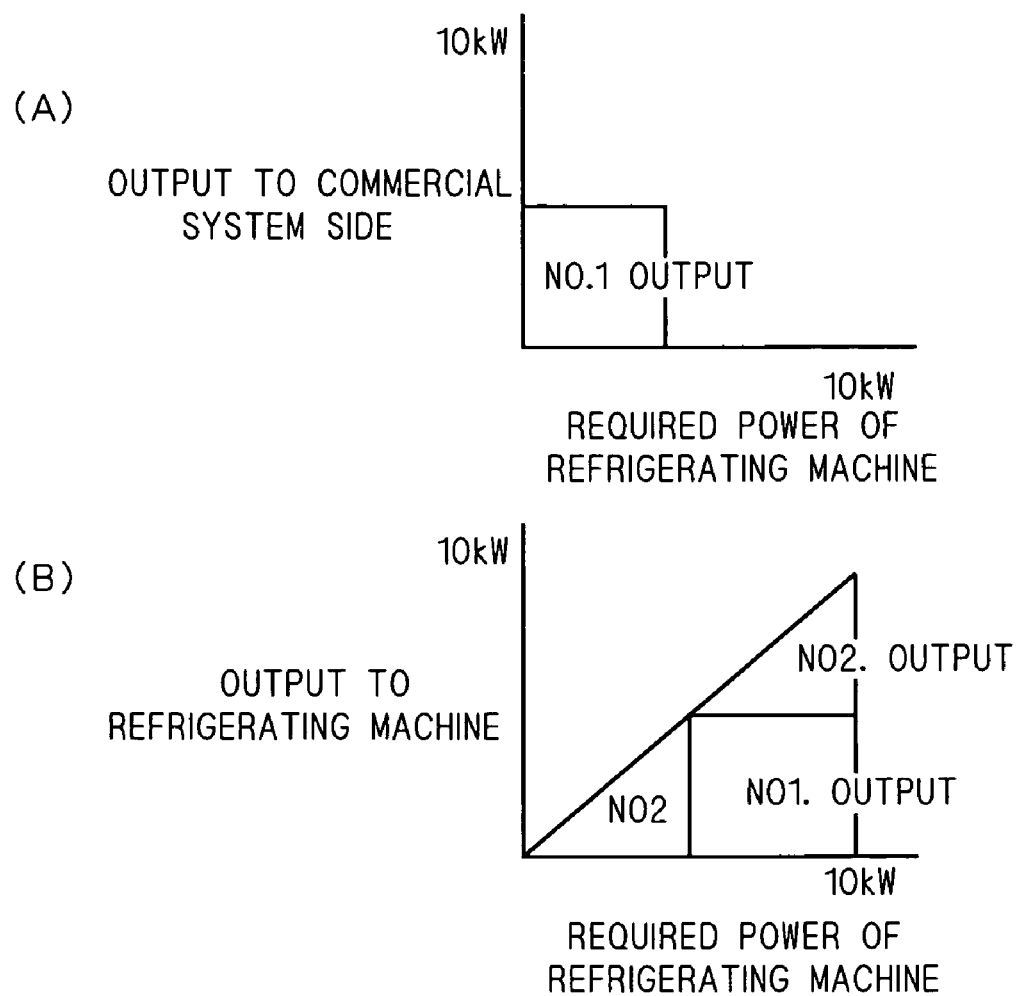
[FIG. 5] are diagrams explaining controlling the number of compression machines according to required operating load of the vapor-compression refrigerating machine and supplying generated power of the fuel cell from an inverter in a not-operating compression machine system to the commercial system side.

This case allows control of the number of compression machines according to required operating load of the vapor-compression refrigerating machine and supply generated power of the fuel cell from the inverter in a not-operating compression machine system to the commercial system side (cf. (A), (B) in FIG. 5). Further, generated power of the fuel cell can also be supplied to the commercial system side at the time of partial load operation.

Figure 6:
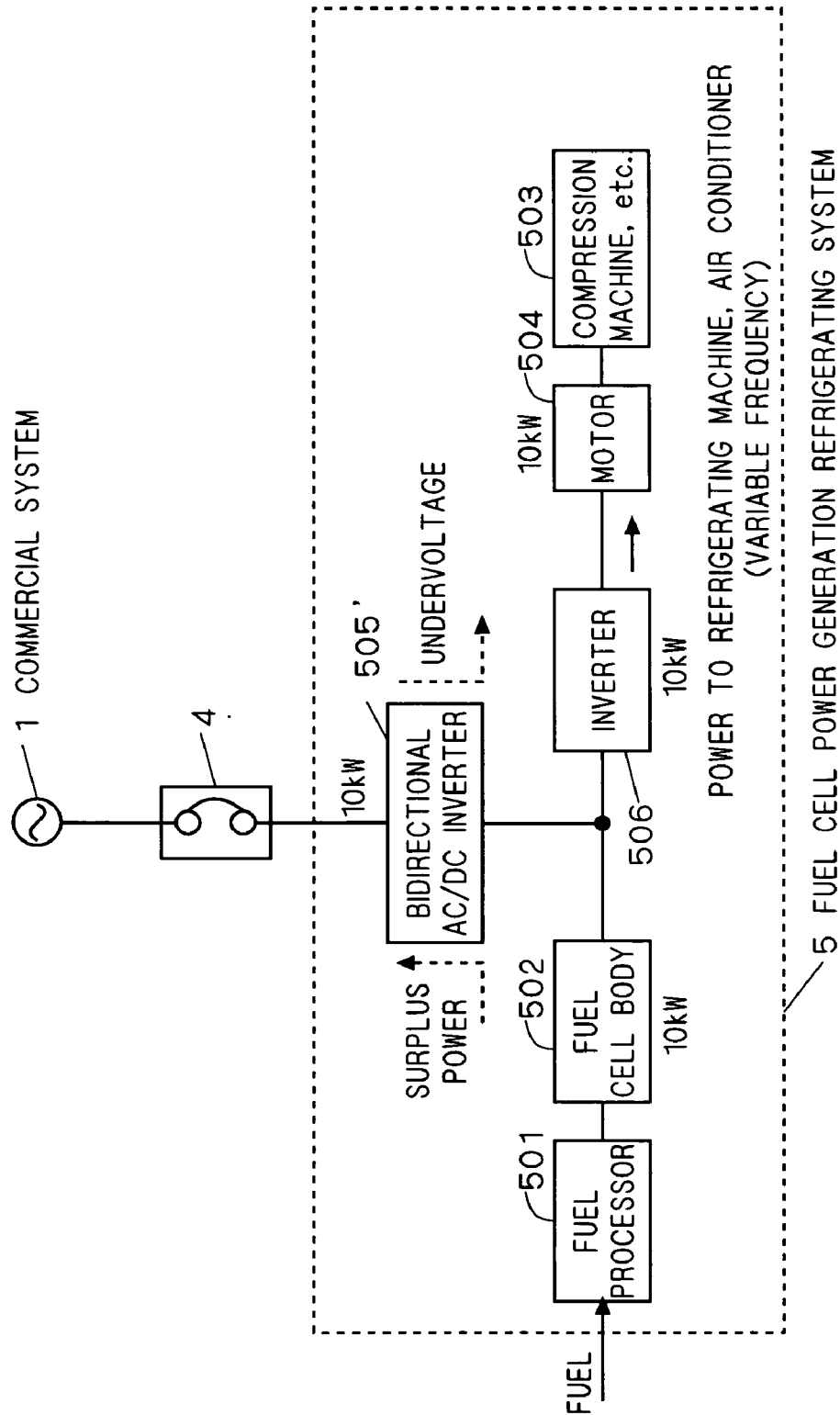
[FIG. 6] is a block diagram showing still another configuration of the fuel cell power generation refrigerating system.

FIG. 6 is a block diagram showing still another configuration of the fuel cell power generation refrigerating system 5.

This fuel cell power generation refrigerating system 5 only differs from the fuel cell power generation refrigerating system 5 shown in FIG. 3 in that: a bidirectional AC/DC inverter 505' is adopted in place of the AC/DC converter 505; the first switch 507 is omitted; and a power path including the second switch 508 is omitted.

In this case, power supply to the refrigerating machine side and power supply to the commercial system side can be separated with a simple configuration, so that surplus generated power of the fuel cell can be supplied to the commercial system side without being affected by operating frequencies of the refrigerating machine.

Figure 7:
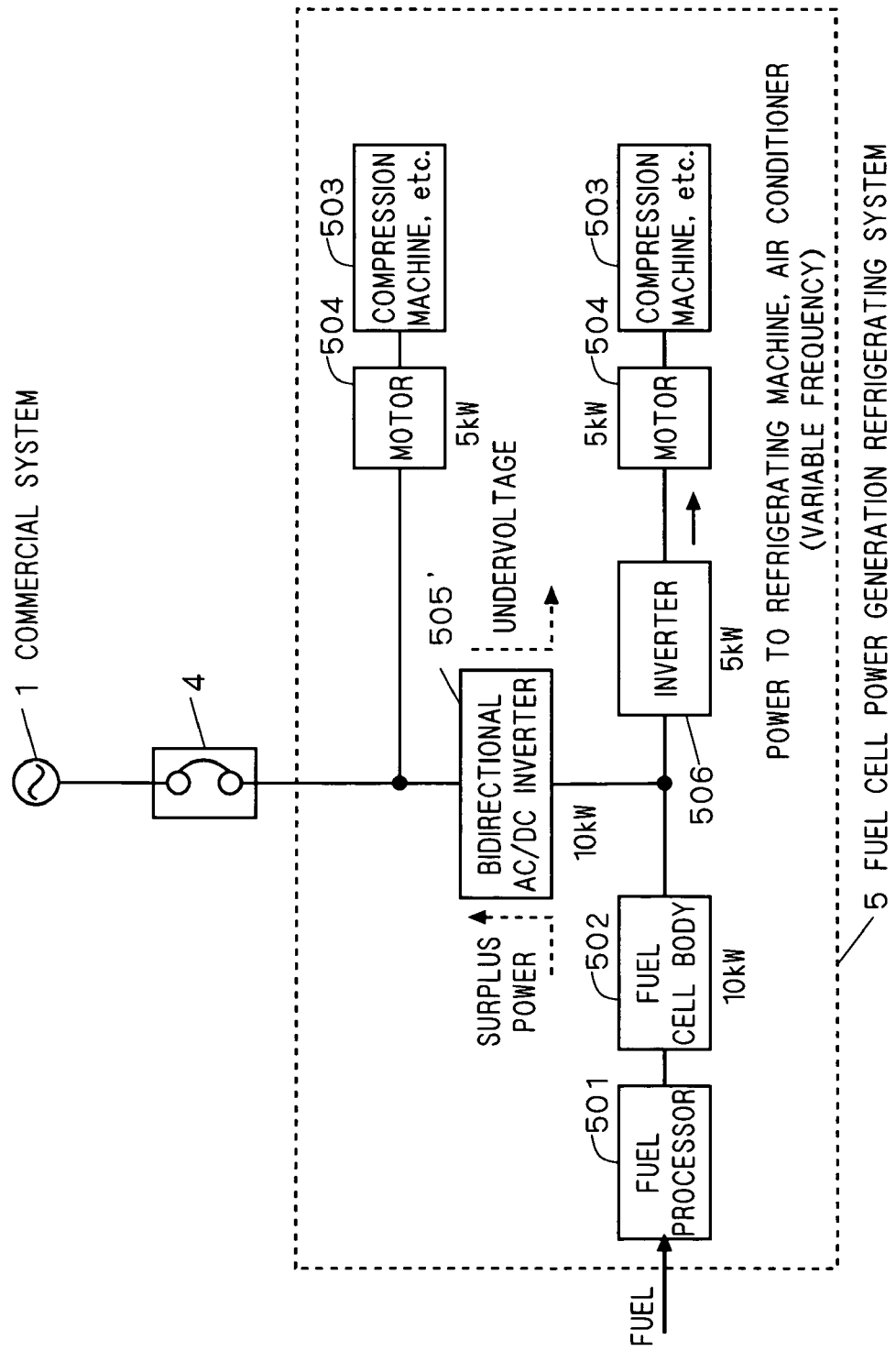
[FIG. 7] is a block diagram showing still another configuration of the fuel cell power generation refrigerating system.

FIG. 7 is a block diagram showing still another configuration of the fuel cell power generation refrigerating system 5.

This fuel cell power generation refrigerating system 5 only differs from the fuel cell power generation refrigerating system 5 shown in FIG. 6 by further including: the motor 504 connected to the refrigeration air-conditioning power board 4 bypassing the bidirectional AC/DC inverter 505'; and the compression machine 503, etc. using this motor 504 as its driving source.

This case achieves reduced capacity of the inverter as well as reduced costs and apparatus volume.

Figure 8:
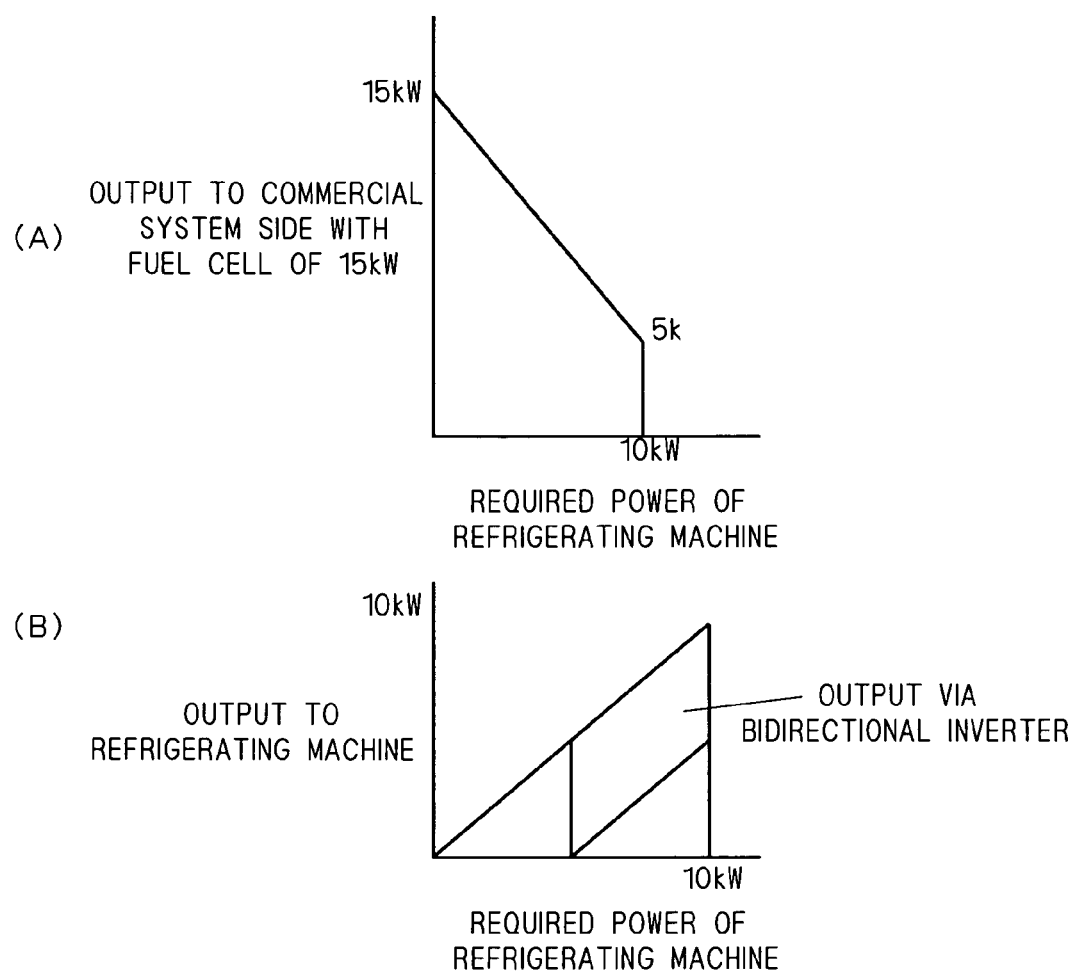
[FIG. 8] are diagrams explaining that power can also be supplied to the commercial system at the time when the vapor-compression refrigerating machine is operating at the maximum capacity.

Further, setting the capacity of the fuel cell higher than the capacity of the inverter which supplies operating power to the compression-machine-driving motor of the vapor-compression refrigerating machine allows generated power to be supplied to the commercial system side via the bidirectional AC/DC inverter 505' in response to that the fuel cell is operating at the maximum capacity, so that power can also be supplied to the commercial system 1 side at the time when the vapor-compression refrigerating machine is operating at the maximum capacity (cf. (A), (B) in FIG. 8).

Figure 9:
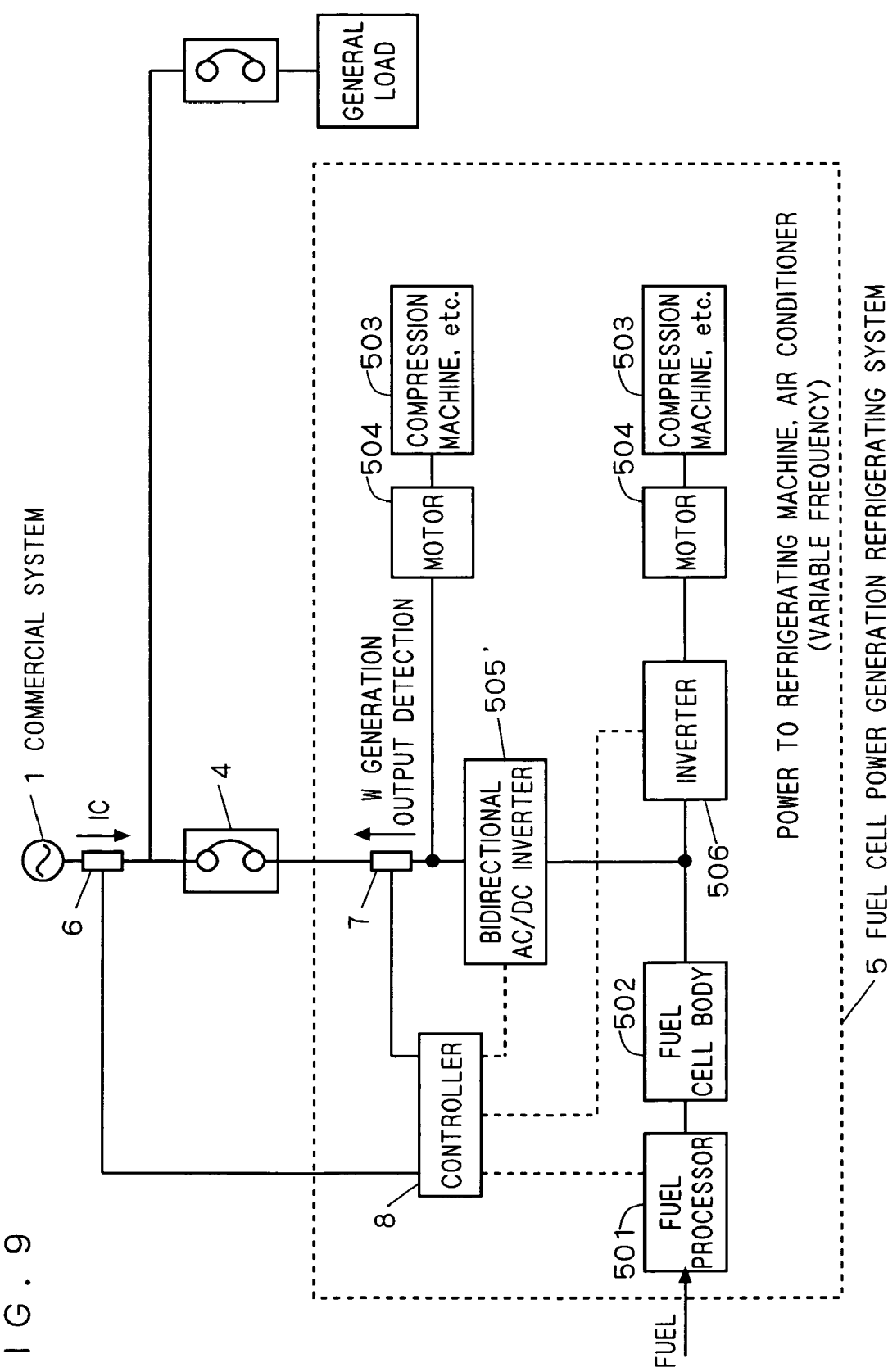
[FIG. 9] is a block diagram showing still another configuration of the fuel cell power generation refrigerating system.

FIG. 9 is a block diagram showing still another configuration of the fuel cell power generation refrigerating system 5.

This fuel cell power generation refrigerating system 5 only differs from the fuel cell power generation refrigerating system 5 shown in FIG. 7 in that: a power amount detection part 6 is connected among the general power board 2, refrigeration air-conditioning power board 4 and commercial system 1; a generation output detection part 7 is connected between the refrigeration air-conditioning power board 4 and bidirectional AC/DC inverter 505'; and a controller 8 receiving output of the power amount detection part 6 and output of the generation output detection part 7 to output control signals to the fuel processor 501, inverter 506 and bidirectional AC/DC inverter 505' is provided.

The aforementioned power amount detection part 6 may be one that actually detects the amount of power, but may be one that detects a current value as a value corresponding to the amount of power.

Figure 10:
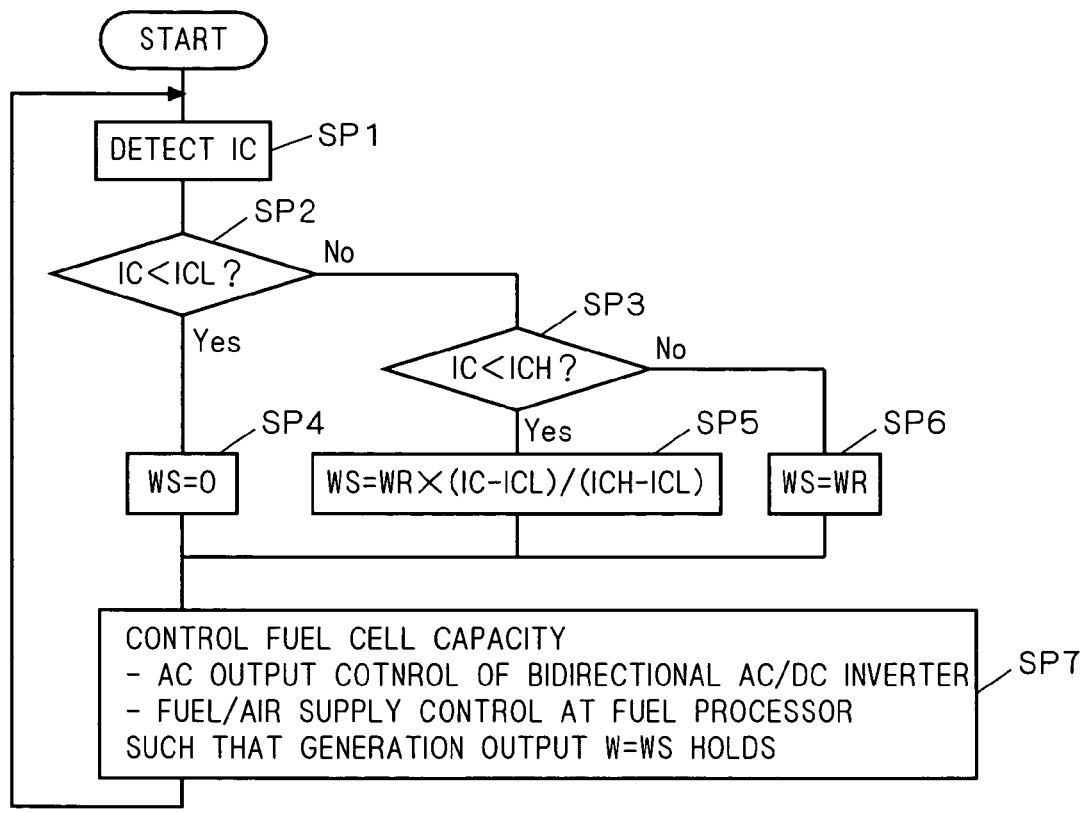
[FIG. 10] is a flow chart explaining the operation of the fuel cell power generation refrigerating system shown in FIG. 9.

FIG. 10 is a flow chart explaining the operation of the fuel cell power generation refrigerating system 5 shown in FIG. 9. In step SP1, a current value IC flowing from the commercial system 1 side is detected, and in step SP2, it is judged whether or not the current value IC is smaller than a first threshold value ICL. In the case where the current value IC is not smaller than the first threshold value ICL, it is judged in step SP3 whether or not the current value IC is smaller than a second threshold value ICH.

Then, in the case where the current value IC is smaller than the first threshold value ICL, a generation output control target value WS of the fuel cell power generation refrigerating system is set at 0 in step SP4.

In the case where the current value IC is a value between the first threshold value ICL and second threshold value ICH, the generation output control target value WS of the fuel cell power generation refrigerating system is set at WR×(IC−ICL)/(ICH−ICL) in step SP5. WR is a fuel cell rated output.

In the case where the current value IC is not smaller than the second threshold value ICH, the generation output control target value WS of the fuel cell power generation refrigerating system is set at WR in step SP6.

In the case where the processing in step SP4, the processing in step SP5 or the processing in step SP6 is performed, fuel cell capacity control (e.g., AC output control of the bidirectional AC/DC converter 505' and fuel/air supply control at the fuel processor 501) is performed in step SP7 such that generated power W becomes equal to the generation output control target value WS of the fuel cell power generation refrigerating system. However, the output of the inverter 506 is controlled by air conditioning request, for example, as conventionally known.

After the processing in step SP7 is performed, the processing in step SP1 is performed again. The threshold values for use in control are determined as follows:

for instance, the threshold value ICL is a current value corresponding to 30% of the fuel cell rated output; and the threshold value ICH is a current value corresponding to the fuel cell rated output.

Figure 11:
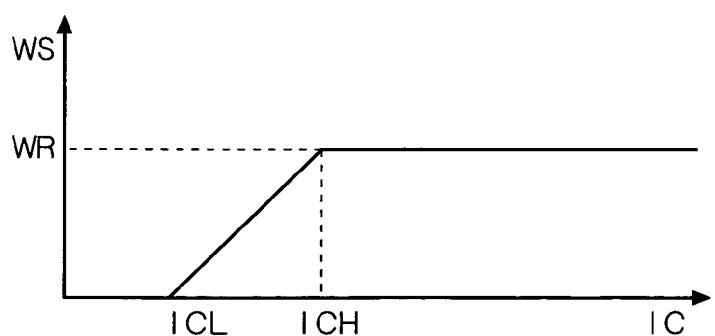
[FIG. 11] is a diagram explaining that a fuel cell generation output control target value WS can be set according to a current value IC.

With such settings, the generation output control target value WS of the fuel cell power generation refrigerating system can be set according to the current value IC as shown in FIG. 11.

This case allows appropriate capacity control of the fuel cell, which can prevent reverse power flow to system power and the like.

Figure 12:
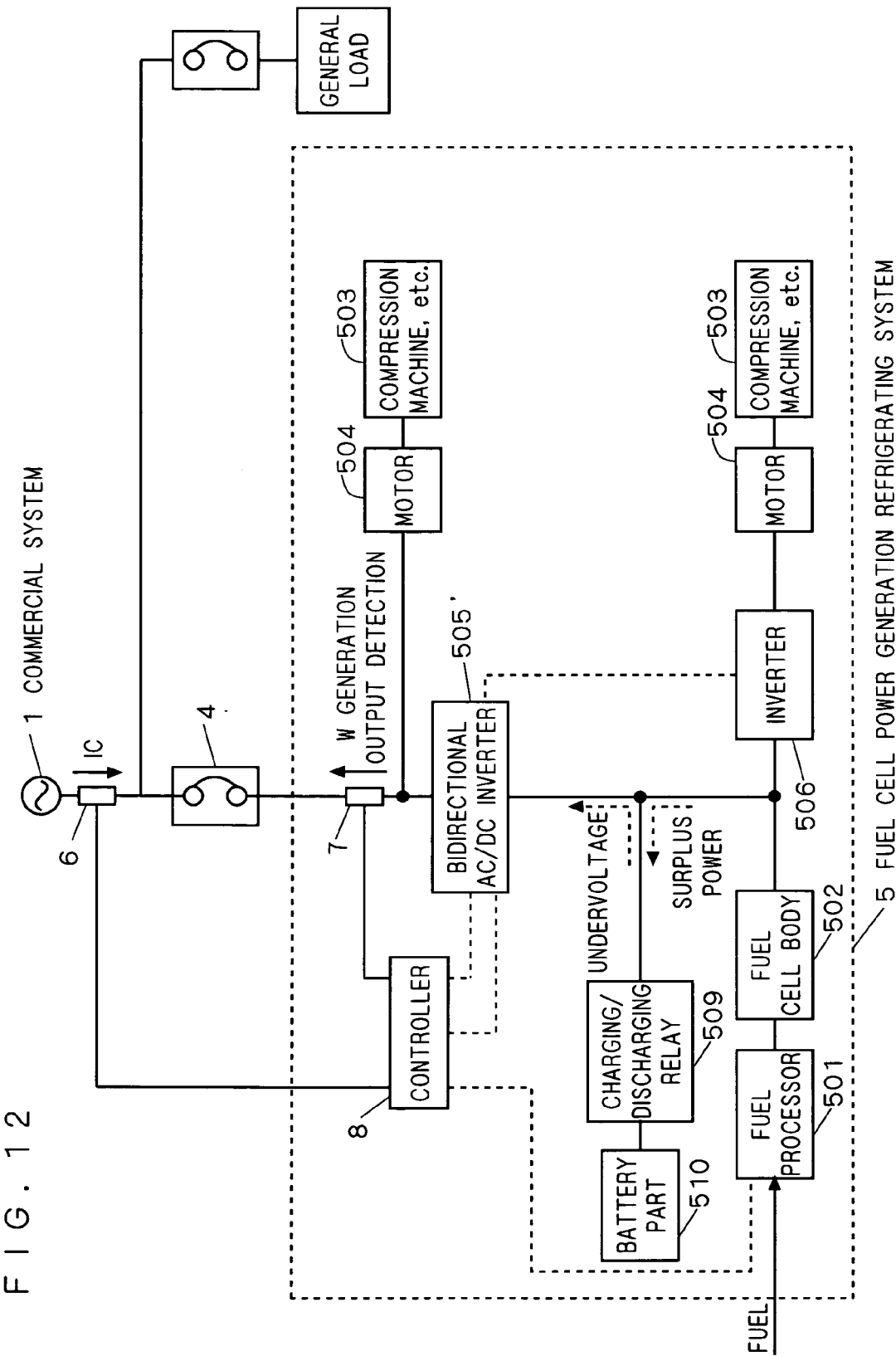
[FIG. 12] is a block diagram showing still another configuration of the fuel cell power generation refrigerating system.

FIG. 12 is a block diagram showing still another configuration of the fuel cell power generation refrigerating system 5.

This fuel cell power generation refrigerating system 5 only differs from the fuel cell power generation refrigerating system 5 shown in FIG. 9 in that a battery part 510 is connected to the fuel cell body 502 via a charging/discharging relay 509 controlled by the controller 8.

As the aforementioned battery part 510, a secondary battery, a capacitor and the like can be illustrated by way of example.

Figure 13:
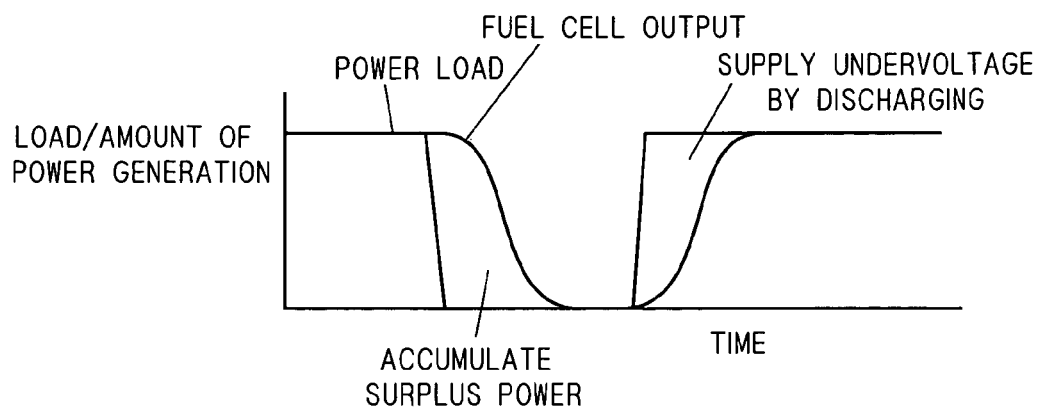
[FIG. 13] is a diagram showing that imbalance between consumption power of load and amount of power generation of the fuel cell can be counteracted.

In this case, where the general load makes fast load fluctuations so that the operating capacity of the fuel cell does not follow, the battery part 510 is charged and discharged, which allows the imbalance between consumption power of the load and the amount of power generation of the fuel cell to be counteracted (cf. FIG. 13).

Figure 14:
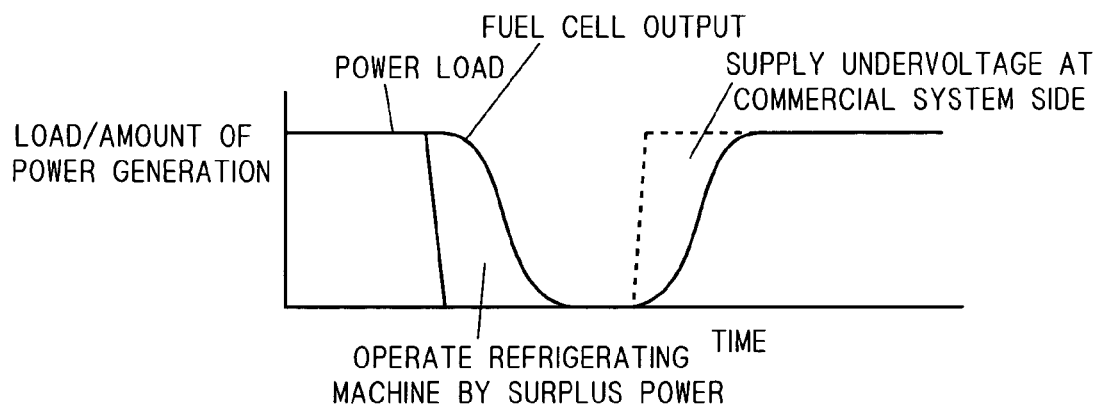
[FIG. 14] is a diagram showing that operating capacity of equipment driven by the vapor-compression refrigerating machine is increased forcedly until the fuel cell follows the load in response to reduction in detected amount of power supply to a certain degree that may cause reverse power flow.

Further, it may be configured such that reduction in detected amount of power supply to a degree that may cause reverse power flow is detected, and in response to this detection, the operating capacity of equipment using the vapor-compression refrigerating machine as its driving source is increased forcedly until the fuel cell follows the load (cf. FIG. 14), which can prevent the delay in following the load without providing the battery part 510, and in the case where the battery part 510 is provided, the capacity of the batter part 510 can be reduced.

Figure 15:
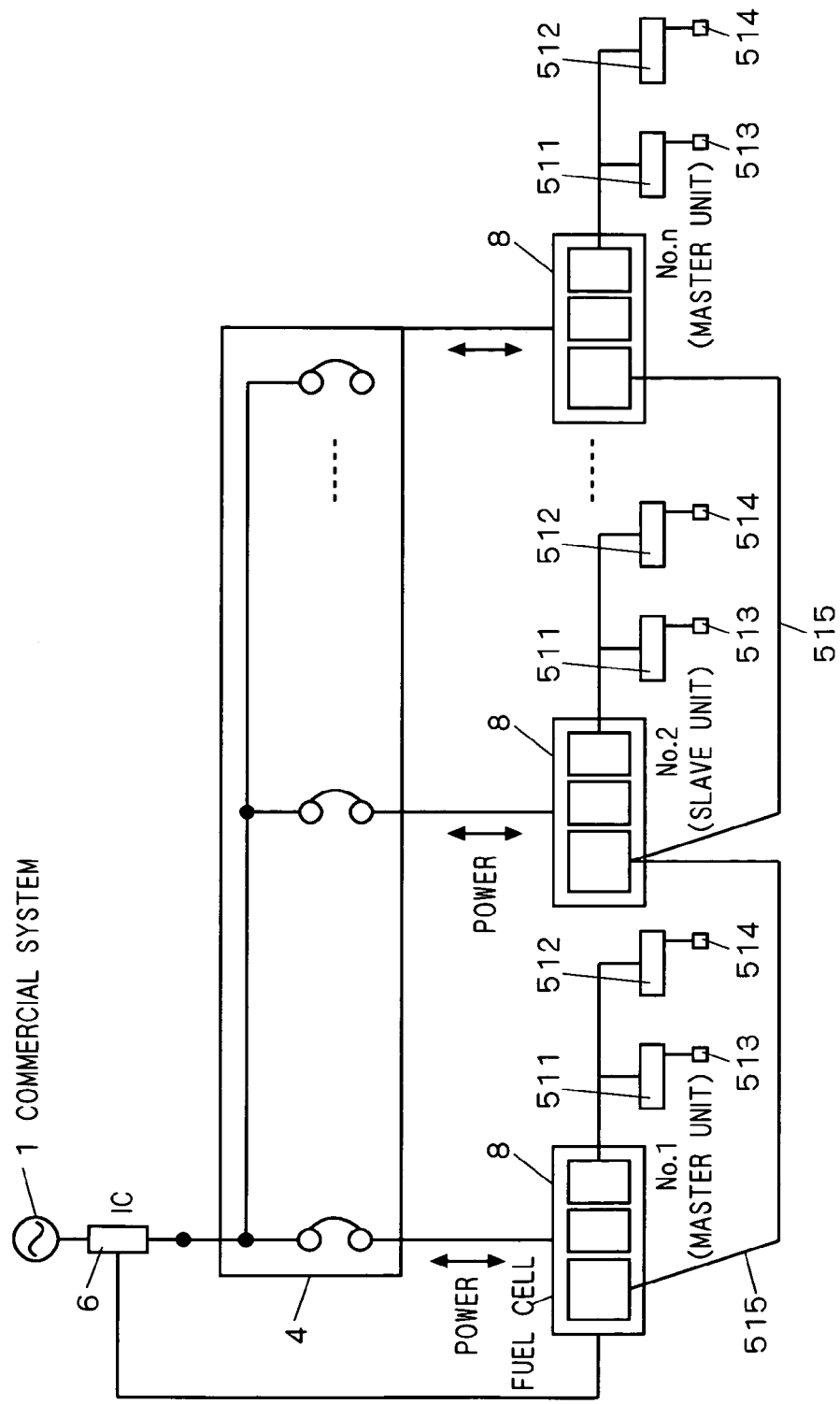
[FIG. 15] is a block diagram schematically showing a power system including one embodiment of the fuel cell power generation refrigerating system of the present invention.

FIG. 15 is a block diagram schematically showing a power system including one embodiment of the fuel cell power generation refrigerating system of the present invention.

This power system has the fuel cell power generation refrigerating system 5 connected to the commercial system 1 via the power amount detection part 6 and further via each of a plurality of refrigeration air-conditioning power boards 4. FIG. 15 only shows controllers 8, outdoor units 511 and indoor units 512 of the air conditioner, air conditioner's remote controllers 513, 514, and fuel-cell-control-dedicated communication lines 515 connecting the controllers 8, however, other components described in the above embodiments are included, as a matter of course.

Further, one of the aforementioned controllers 8 is a master unit, and the remainder are slave units.

Figure 16:
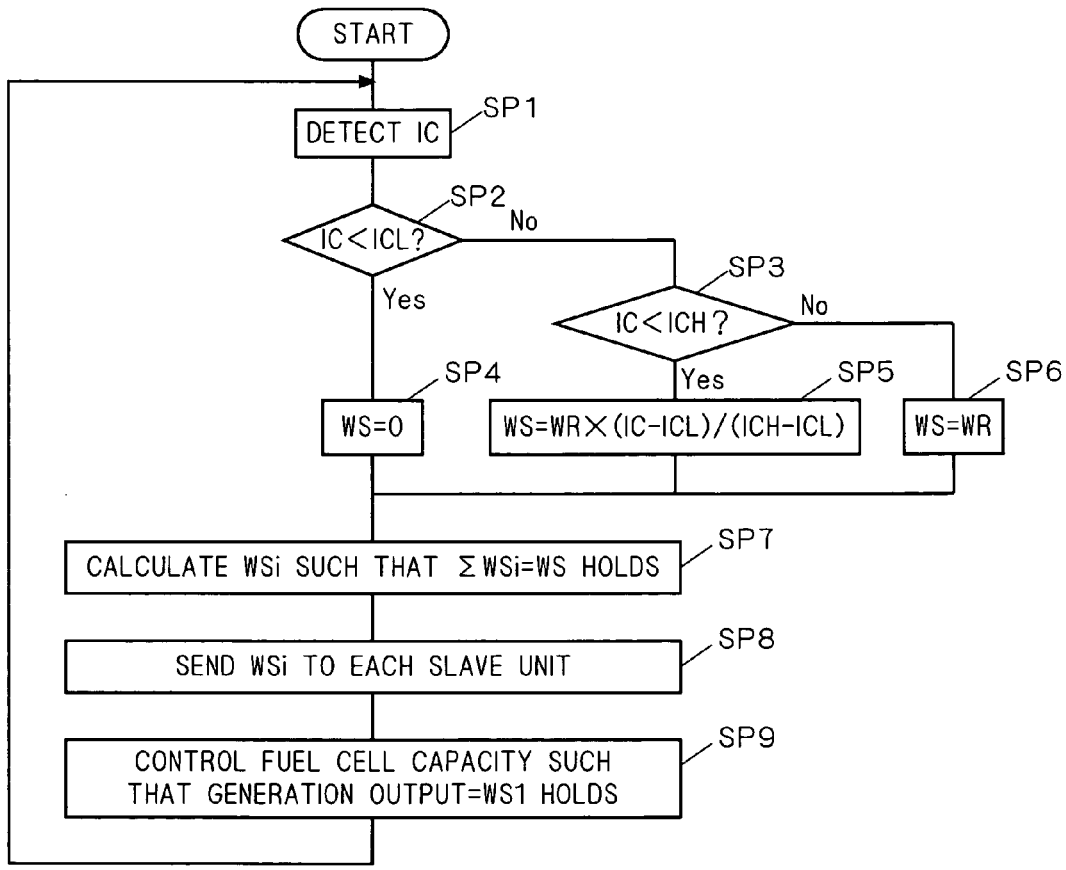
[FIG. 16] is a flow chart explaining processing of a master unit.

FIG. 16 is a flow chart explaining processing of the master unit.

In step SP1, a current value IC flowing from the commercial system 1 side is detected, and in step SP2, it is judged whether or not the current value IC is smaller than the first threshold value ICL. In the case where the current value IC is not smaller than the first threshold value ICL, it is judged in step SP3 whether or not the current value IC is smaller than the second threshold value ICH.

Then, in the case where the current value IC is smaller than the first threshold value ICL, the fuel cell generation output control target value WS is set at 0 in step SP4.

In the case where the current value IC is a value between the first threshold value ICL and second threshold value ICH, the fuel cell generation output control target value WS is set at WR×(IC−ICL)/(ICH−ICL) in step SP5. WR is a fuel cell rated output.

In the case where the current value IC is not smaller than the second threshold value ICH, the fuel cell generation output control target value WS is set at WR in step SP6.

In the case where the processing in step SP4, the processing in step SP5 or the processing in step SP6 is performed, a target generation output WSi is calculated in step SP7 such that ΣWSi becomes WS (for example, the target generation output WSi is calculated by an operation of WSi=WS/n), and in step SP8, the target generation output WSi is sent to each slave unit, and in step SP9, the capacity of the fuel cell is controlled such that the generation output becomes a target generation output WS1.

Note that n indicates the number of controllers 8.

After the processing in step SP9 is performed, the processing in step SP1 is performed again.

Figure 17:
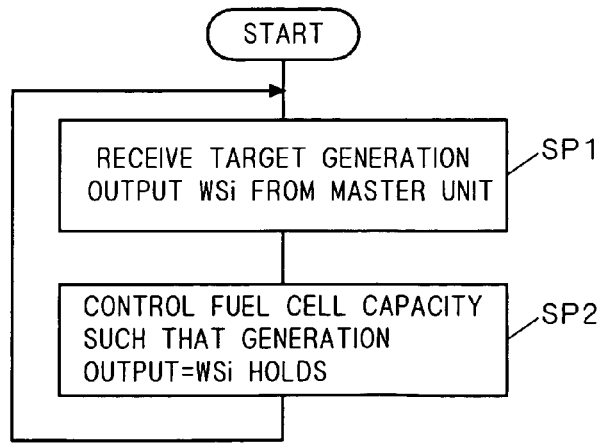
[FIG. 17] is a flow chart explaining processing of a slave unit.

FIG. 17 is a flow chart explaining processing of a slave unit.

In step SP1, the target generation output WSi is received from the master unit, and in step SP2, the capacity of the fuel cell is controlled such that the generation output becomes the target generation output WSi.

After the processing in step SP2 is performed, the processing in step SP1 is performed again.

Control of the air conditioner side is intended to be carried out based on the operation settings from the air conditioner's remote controllers independently of the fuel cell. Needless to say, a refrigerating machine for another purpose can be adopted instead of the air conditioner.

This case allows close follow-up to air conditioning load (refrigeration load) as well as improved load follow-up by controlling the number of units even when the general load is small, and further, increased reliability in power supply.

Figure 18:
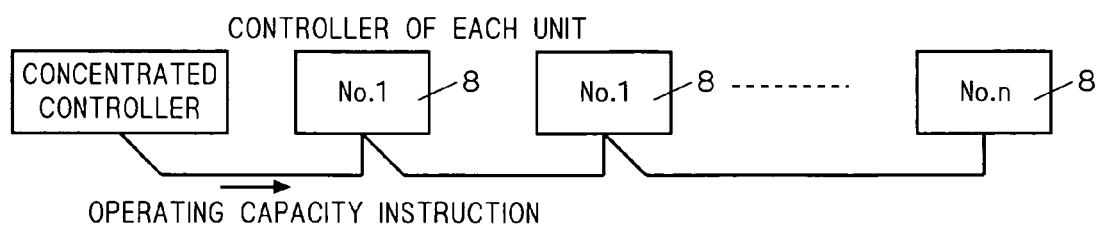
[FIG. 18] is a block diagram schematically showing a power system including one embodiment of the fuel cell power generation refrigerating system of the present invention.

FIG. 18 is a block diagram schematically showing a power system including one embodiment of the fuel cell power generation refrigerating system of the present invention.

In FIG. 18, a concentrated controller 80 is provided, so that an operating capacity instruction is supplied from this concentrated controller 80 to each controller 8. That is, a distinction between a master unit and slave units is precluded.

Figure 19:
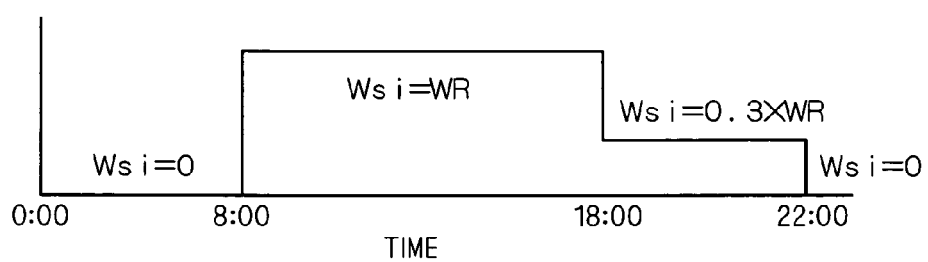
[FIG. 19] is a diagram showing an example of operating capacity instruction by time scheduled operation.

This case allows a scheduled operation (e.g., see FIG. 19), total generation capacity control and the like to be carried out efficiently.

Figure 20:
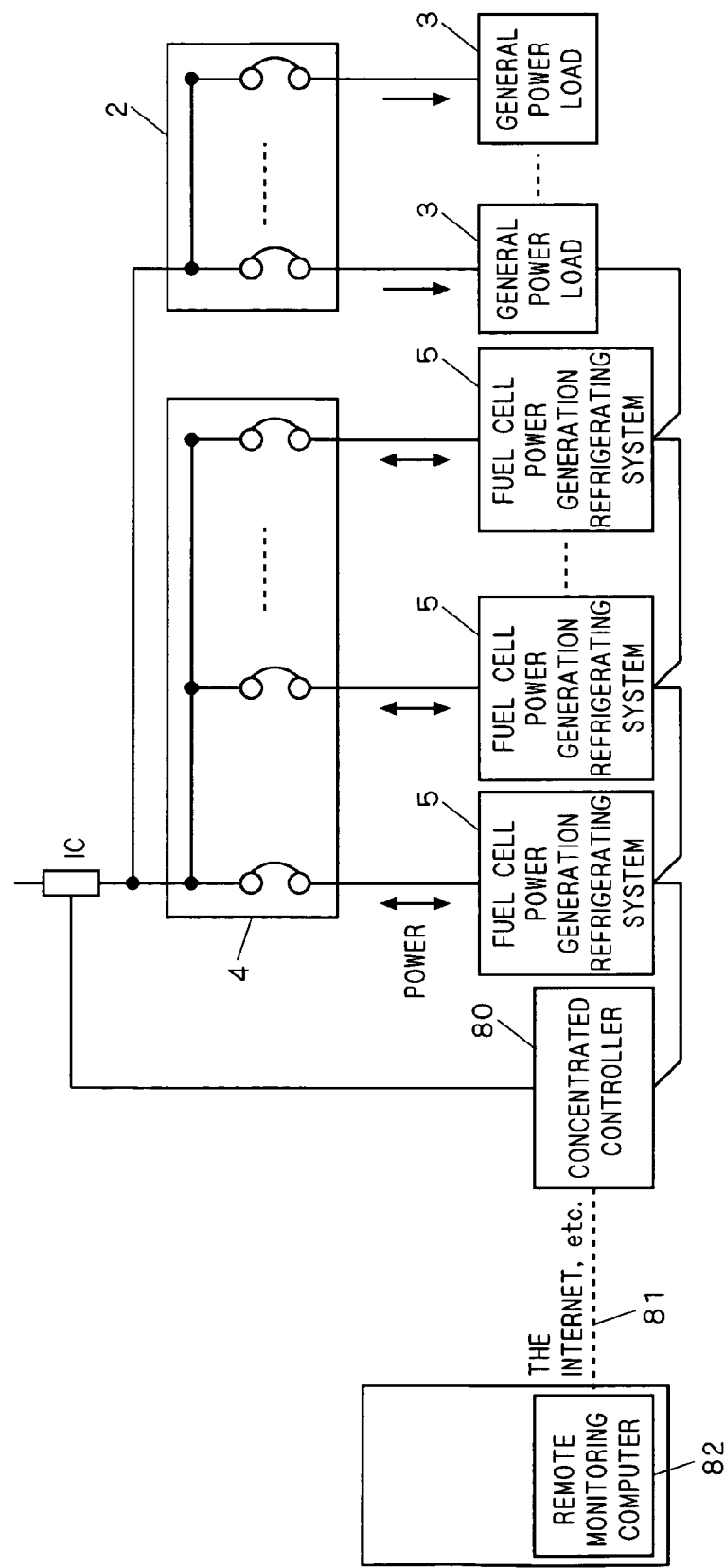
[FIG. 20] is a block diagram schematically showing a power system including one embodiment of the fuel cell power generation refrigerating system of the present invention.

FIG. 20 is a block diagram schematically showing a power system including one embodiment of the fuel cell power generation refrigerating system of the present invention.

In FIG. 20, this power system has fuel cell power generation refrigerating systems 5 connected to the commercial system 1 via the refrigeration air-conditioning power board 4. The general power load 3 is connected to the commercial system 1 via the general power board 2. The concentrated controller 80 receiving output of the power amount detection part 6 to perform predetermined processing to supply an operation instruction to the fuel cell power generation refrigerating systems 5 is provided. Then, this concentrated controller 80 is connected to a remote monitoring computer 82 via a communication network 81 such as the Internet.

In this case, concentration of information to the concentrated controller 80 can achieve appropriate operation control. In addition, it is preferable that the aforementioned concentrated controller 80 further include a fee output part for at least outputting an electricity fee and a fuel fee and a control part for controlling operation of the fuel cell and performing distribution control of output power, which can perform fine priority-giving output control (control as to which output is given priority) according to season, time, and the like, so that running merits can be maximized.

The aforementioned fee output part may be one that calculates and outputs fees, or may be one that stores fees and outputs necessary ones.

In the aforementioned fee output part, however, it is preferable that unit cost data and fee calculation software for fee calculation be rewritable by the remote monitoring computer 82, which can save customers from having to input these data and software and prevent disadvantages caused by failure to update and the like.

Figure 21:
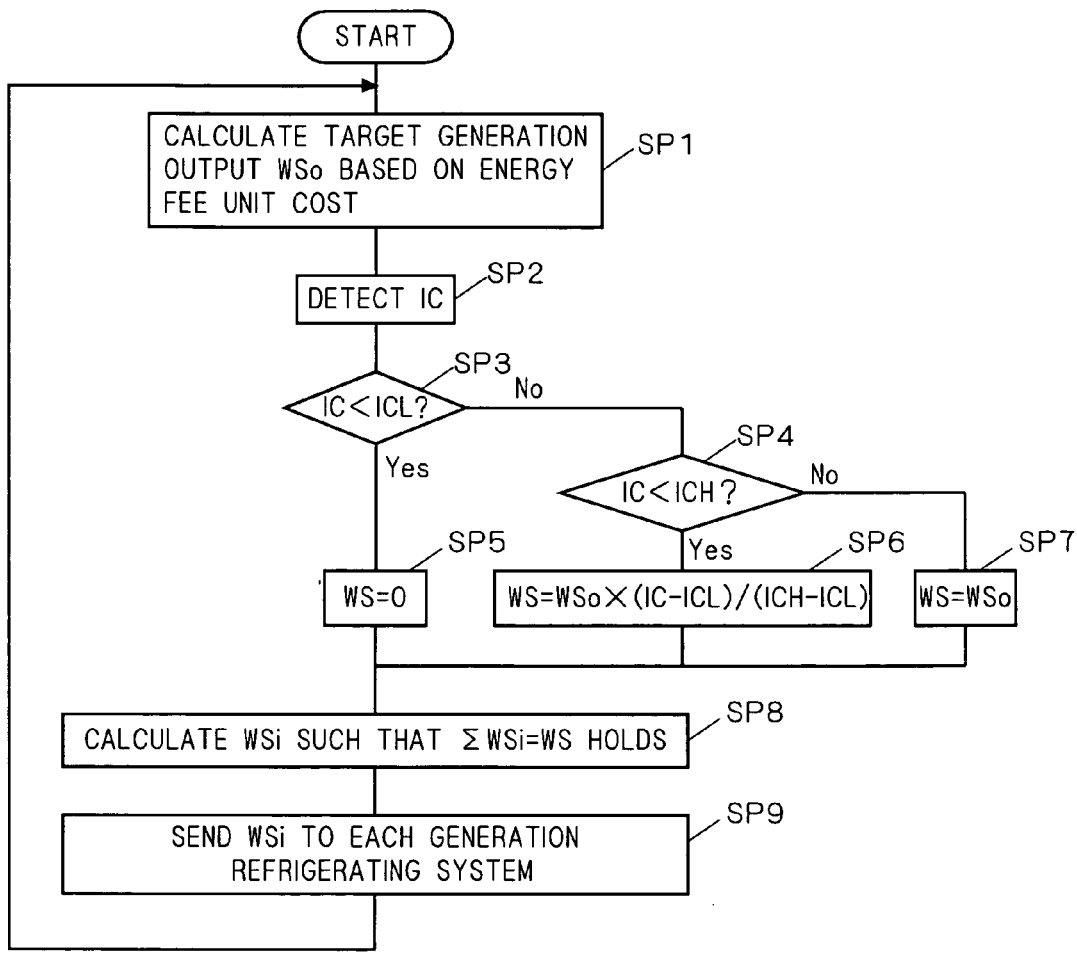
[FIG. 21] is a flow chart explaining an example of control of the amount of power generation by a concentrated controller.

FIG. 21 is a flow chart explaining an example of generation amount control at the concentrated controller 80.

In step SP1, a target generation output WSo is calculated based on energy fee unit cost. In step SP2, the current value IC flowing from the commercial system 1 side is detected. In step SP3, it is judged whether or not the current value IC is smaller than the first threshold value ICL, and in the case where the current value IC is not smaller than the first threshold value ICL, it is judged in step SP4 whether or not the current value IC is smaller than the second threshold value ICH.

Then, in the case where the current value IC is smaller than the first threshold value ICL, the fuel cell generation output control target value WS is set at 0 in step SP5.

In the case where the current value IC is a value between the first threshold value ICL and second threshold value ICH, the fuel cell generation output control target value WS is set at WSo×(IC−ICL)/(ICH−ICL) in step SP6.

In the case where the current value IC is not smaller than the second threshold value ICH, the fuel cell generation output control target value WS is set at WSo in step SP7.

In the case where the processing in step SP5, the processing in step SP6 or the processing in step SP7 is performed, the target generation output WSi is calculated in step SP8 such that ΣWSi becomes WS (for example, the target generation output WSi is calculated by an operation of WSi=WS/n), and in step SP9, the target generation output WSi is sent to each fuel cell power generation refrigerating system 5.

After the processing in step SP9 is performed, the processing in step SP1 is performed again.

The processing in the aforementioned step SP1 is performed, for example, as follows:

First, calculation of electricity fee CE [yen/kWh] is carried out as follows:

summer time (7/1~9/30) on weekdays, 13:00~16:00, CE=15.9;

summer time (7/1~9/30) on weekdays, 8:00~13:00, 16:00~22:00, CE=14.7;

others (10/1~6/30) on weekdays, 8:00~22:00, CE=13.65; and 22:00~8:00 or holidays, CE=6.05.

Further, calculation of gas fee CG [yen/kWh] is carried out as follows:

CG=4.

Further, calculation of maintenance costs CM [yen/kWh] is carried out as follows:

CM=2.

Further, calculation of generation efficiency E [−] is carried out as follows:

E=0.45.

Based on these, calculation of the target generation output WSo [kW] is carried out as follows:

WSo=WR in the case where CG/E+CM<CE holds; and

WSo=0 in the case where CG/E+CM≧CE holds.

Figure 22:
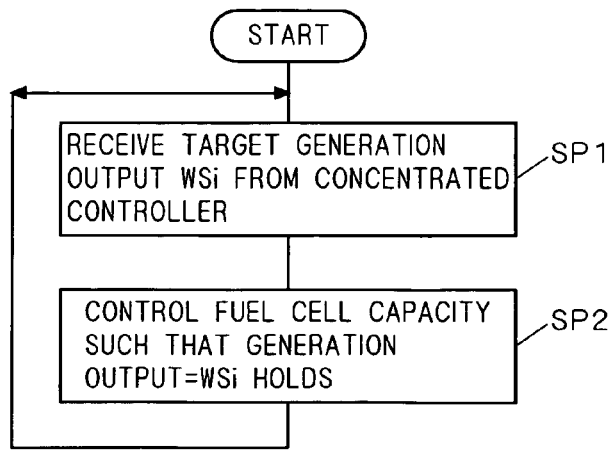
[FIG. 22] is a flow chart explaining an example of control of the amount of power generation of the fuel cell power generation refrigerating system.

FIG. 22 is a flow chart explaining processing of each fuel cell power generation refrigerating system 5.

In step SP1, the target generation output WSi is received from the concentrated controller 80, and in step SP2, the capacity of the fuel cell is controlled such that the generation output becomes the target generation output WSi.

After the processing in step SP2 is performed, the processing in step SP1 is performed again.

Control of the air conditioner side is intended to be carried out based on the operation settings from the air conditioner's remote controllers independently of the fuel cell. Needless to say, a refrigerating machine for another purpose can be adopted instead of the air conditioner.

In each of the above-described embodiments, it is preferable that the aforementioned vapor-compression refrigerating machine be one that utilizes a direct expansion cycle. Arranging refrigerating machines of direct expansion cycle in a distributed manner for respective load systems can facilitate follow-up to the load and individual operation/stop, which in turn can achieve improved convenience and energy efficiency.

Figure 23:
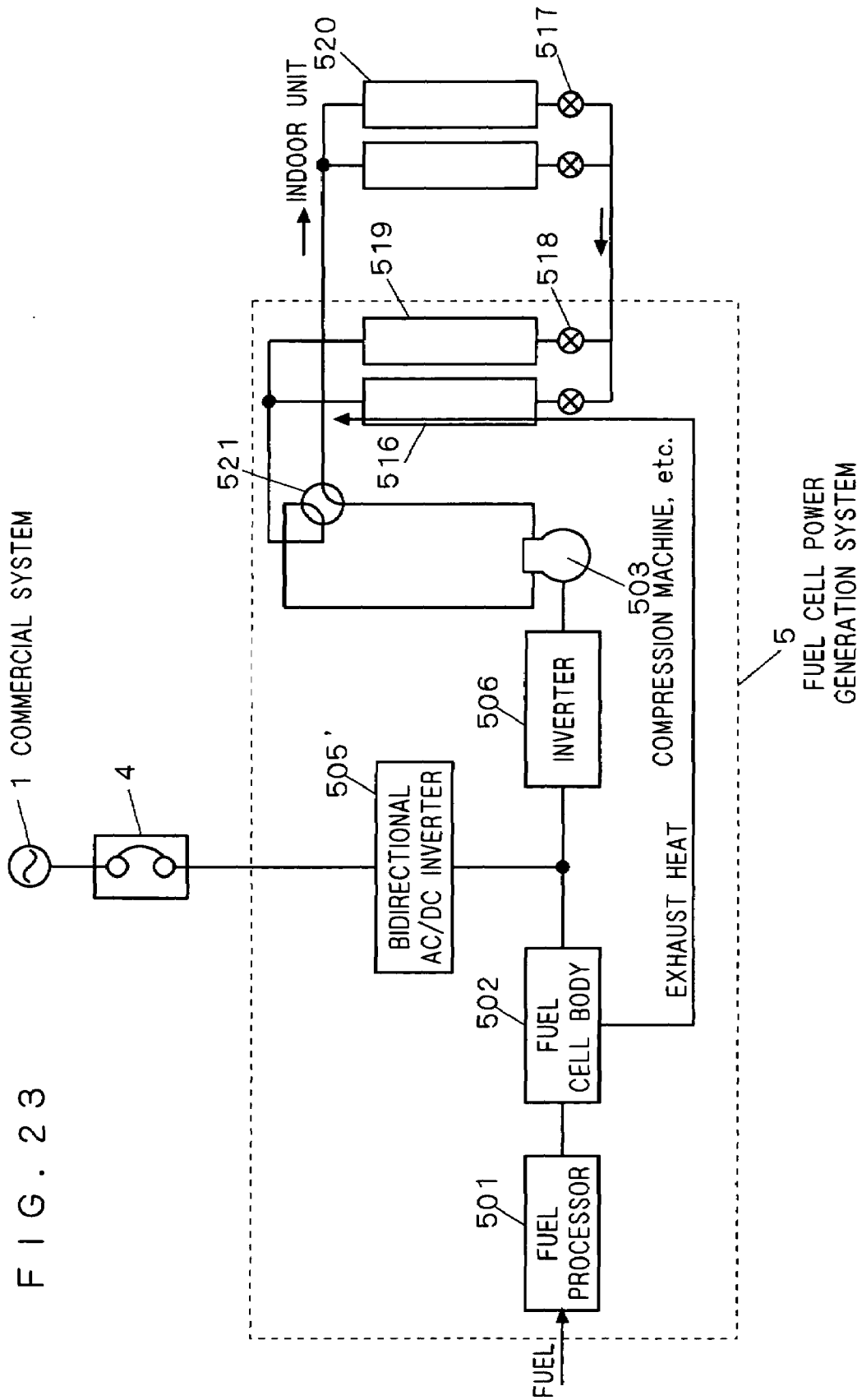
[FIG. 23] is a schematic block diagram showing still another configuration of the fuel cell power generation refrigerating system of the present invention.

FIG. 23 is still another configuration of the fuel cell power generation refrigerating system.

This fuel cell power generation refrigerating system 5, as conventionally known, has a refrigerant circuit for compressing refrigerant gas by the compression machine 503 which uses a motor as its driving source, condensing by a condenser 520, decompressing by an expansion valve 518 and thereafter evaporating refrigerant by an evaporator 519, and further, a four-way valve 521 for reversing the flow of refrigerant is provided so as to perform a cooling operation or a heating operation.

FIG. 23 shows the heating operation, and the evaporator 519 is an outdoor heat exchanger, and the condenser 520 is an indoor heat exchanger. The four-way valve 521 is switched at the time of cooling operation, so that the outdoor heat exchanger becomes a condenser, and the indoor heat exchanger becomes an evaporator. In the cooling operation, the refrigerant is compressed by an expansion valve 517 provided for each room.

Then, an exhaust-heat-using heat exchanger 516 for heat exchanging between exhaust heat from the fuel cell body 502 and refrigerant is provided.

In this case, exhaust heat is utilized in the same system to achieve appropriate use, which in turn can improve energy efficiency.

Figure 24:
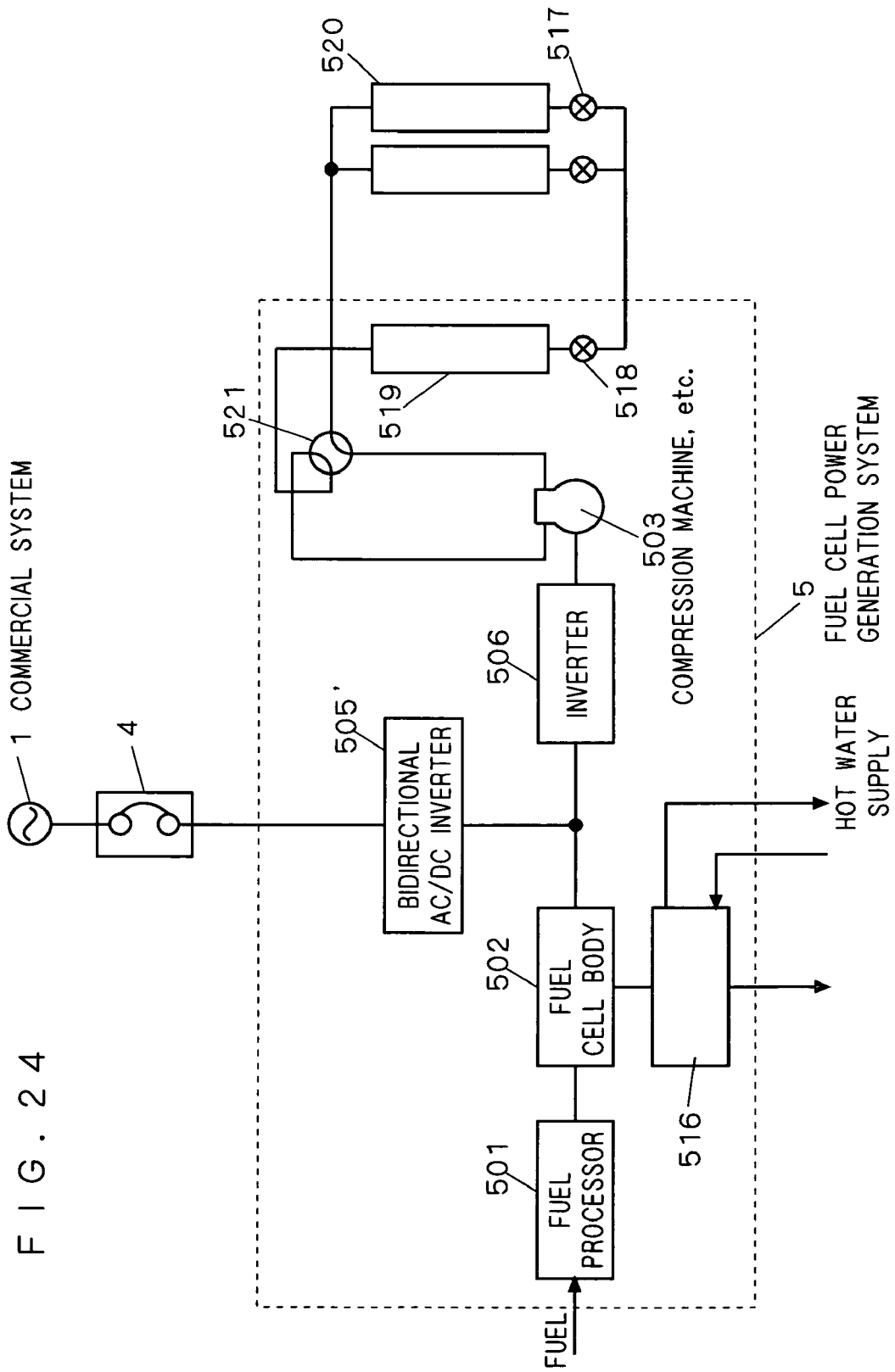
[FIG. 24] is a schematic block diagram showing still another configuration of the fuel cell power generation refrigerating system of the present invention.

FIG. 24 is still another configuration of the fuel cell power generation refrigerating system.

This fuel cell power generation refrigerating system 5 only differs from the fuel cell power generation refrigerating system 5 shown in FIG. 23 in that, as the exhaust-heat-using heat exchanger 516, one that heat exchanges between exhaust heat from the fuel cell body 502 and water to provide hot water supply is adopted.

However, it is not limited to the one that provides hot water supply, but it is applicable to various devices that utilizes heat.

In this case, exhaust heat can be utilized preferentially in devices having a lower energy utilization efficiency than the refrigerating machine and the like, so that energy efficiency can be improved.

While the invention has been shown and described in detail, the foregoing description is in all aspects illustrative and not restrictive. It is therefore understood that numerous modifications and variations can be devised without departing from the scope of the invention.

The invention claimed is:

1. A fuel cell power generation refrigerating system comprising:
    a vapor-compression refrigerating machine;
    a fuel cell, wherein
        driving power of a compression-machine-driving motor of said vapor-compression refrigerating machine is provided by power generated by said fuel cell, and
        power generated by said fuel cell is supplied to a commercial system side in response to that total required power of said vapor-compression refrigerating machine is below a power generation capacity of said fuel cell;
    a first power conversion element provided between said fuel cell and said compression-machine-driving motor; and
    a second power conversion element provided between said commercial system and said compression-machine-driving motor, wherein
    said first power conversion element and said second power conversion element share at least one inverter.

2. A fuel cell power generation refrigerating system comprising:
    a vapor-compression refrigerating machine;
    a power board supplying operating power to said vapor-compression refrigerating machine using a power supply of a commercial system as an input;
    a fuel cell;
    a first power conversion element performing predetermined power conversion using an output of the fuel cell as an input to supply operating power to a compression-machine-driving motor of said vapor-compression refrigerating machine;
    a power supply control element providing driving power of said compression-machine-driving motor of said vapor-compression refrigerating machine by power generated by said fuel cell as well as supplying power generated by said fuel cell to said commercial system side in response to that total required power of said vapor-compression refrigerating machine is below a power generation capacity of said fuel cell; and
    a second power conversion element provided between said commercial system and said compression-machine-driving motor, wherein
    said first power conversion element between said fuel cell and said compression-machine-driving motor and said second power conversion element share at least one inverter.

3. The fuel cell power generation refrigerating system according to claim 2, further comprising a plurality of compression machines for said vapor-compression refrigerating machine and a plurality of inverters, wherein
    the number of operating compression machines is controlled according to required operating load of said vapor-compression refrigerating machine, and generated power of a fuel cell is supplied to said commercial system side from an inverter in a not-operating compression machine system.

4. The fuel cell power generation refrigerating system according to claim 2, adopting a bidirectional AC/DC inverter as an AC/DC converter to be connected with said commercial system.

5. The fuel cell power generation refrigerating system according to claim 2, further comprising a plurality of compression machines for said vapor-compression refrigerating machine, wherein
some of motors for driving some of said compression machines are connected directly to said commercial system side.

6. The fuel cell power generation refrigerating system according to claim 4, wherein
a capacity of a fuel cell is set higher than a capacity of an inverter supplying operating power to said compression-machine-driving motor of a vapor-compression refrigerating machine, and
generated power is supplied to said commercial system side via said bidirectional AC/DC inverter in response to that said fuel cell is operating at the maximum capacity.

7. The fuel cell power generation refrigerating system according to claim 1 or 2, wherein
the amount of power supply from said commercial system side to a system inside a building including a fuel cell power generation refrigerating system is detected, and
power output control of said fuel cell power generation refrigerating system is performed in response to the detected amount of power supply.

8. The fuel cell power generation refrigerating system according to claim 1 or 2, further comprising a battery element connected in parallel to said fuel cell.

9. The fuel cell power generation refrigerating system according to claim 1 or 2, wherein
the amount of power supply from said commercial system side to a system inside a building including said fuel cell power generation refrigerating system is detected,
it is detected that the detected amount of power supply has been reduced to a degree that may cause reverse power flow, and
in response to this detection, an operating capacity of said vapor-compression refrigerating machine is increased forcedly until said fuel cell follows a load.

10. The fuel cell power generation refrigerating system according to claim 1 or 2, wherein
a plurality of fuel cell power generation refrigerating systems are provided for one power customer.

11. The fuel cell power generation refrigerating system according to claim 10, further comprising a controller provided in common for said plurality of fuel cell power generation refrigerating systems, wherein
said controller provided in common at least controls operation of fuel cells of said plurality of fuel cell power generation refrigerating systems.

12. The fuel cell power generation refrigerating system according to claim 11, wherein
the amount of power supply from said commercial system side to a system inside a building including said fuel cell power generation refrigerating system is detected, and
the controller provided in common controls operation of said fuel cells in response to the detected amount of power supply.

13. The fuel cell power generation refrigerating system according to claim 1 or 2, further comprising:
a fee output element at least outputting an electricity fee and a fuel fee; and
a control element controlling operation of said fuel cell and performing distribution control of output power in response to the fees.

14. The fuel cell power generation refrigerating system according to claim 13, wherein
said fee output element allows unit cost data and fee calculation software for fee calculation to be rewritten at a remote place.

15. The fuel cell power generation refrigerating system according to claim 1 or 2, wherein
said vapor-compression refrigerating machine utilizes a direct expansion cycle.

16. The fuel cell power generation refrigerating system according to claim 1, further comprising a plurality of compression machines for said vapor-compression refrigerating machine and a plurality of inverters, wherein
the number of operating compression machines is controlled according to required operating load of said vapor-compression refrigerating machine, and
generated power of a fuel cell is supplied to said commercial system side from an inverter in a not-operating compression machine system.

17. The fuel cell power generation refrigerating system according to claim 1, adopting a bidirectional AC/DC inverter as an AC/DC converter to be connected with said commercial system.

18. The fuel cell power generation refrigerating system according to claim 1, further comprising a plurality of compression machines for said vapor-compression refrigerating machine, wherein
some of motors for driving some of said compression machines are connected directly to said commercial system side.

19. The fuel cell power generation refrigerating system according to claim 17, wherein
a capacity of a fuel cell is set higher than a capacity of an inverter supplying operating power to said compression-machine-driving motor of a vapor-compression refrigerating machine, and
generated power is supplied to said commercial system side via said bidirectional AC/DC inverter in response to that said fuel cell is operating at the maximum capacity.

* * * * *